United States Patent
Chang (10) Patent No.: US 10,259,351 B2
(45) Date of Patent: Apr. 16, 2019

(54) SEAT RECLINER FOR VEHICLE (71) Applicant: HYUNDAI DYMOS INCORPORATED, Seosan-si, Chungcheongnam-do (KR)

(72) Inventor: Seung Hun Chang, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 15/681,330

(22) Filed: Aug. 18, 2017

(65) Prior Publication Data
US 2017/0361736 A1 Dec. 21, 2017

Related U.S. Application Data (63) Continuation of application No. PCT/KR2016/005724, filed on May 30, 2016.

(30) Foreign Application Priority Data

Sep. 25, 2015 (KR) .................. 10-2015-0136191

(51) Int. Cl.
  *B60N 2/20* (2006.01)
  *B60N 2/22* (2006.01)
  *B60N 2/235* (2006.01)
(52) U.S. Cl.
  CPC ............. *B60N 2/2227* (2013.01); *B60N 2/20* (2013.01); *B60N 2/236* (2015.04); *B60N 2/2362* (2015.04)
(58) Field of Classification Search
  CPC .... B60N 2/2227; B60N 2/236; B60N 2/2362; B60N 2/20
  (Continued)

(56) References Cited

U.S. PATENT DOCUMENTS 5,984,413 A * 11/1999 Baloche .............. B60N 2/2358
  297/367 R
7,407,230 B1 * 8/2008 Luo ..................... B60N 2/236
  297/367 R (Continued)

FOREIGN PATENT DOCUMENTS

JP 2010506623 3/2010
JP 2014057726 4/2014
(Continued)

OTHER PUBLICATIONS

International Search Report for International Application PCT/KR2016/005724, dated Sep. 19, 2016.

*Primary Examiner* — Mark R Wendell
(74) *Attorney, Agent, or Firm* — Burris Law, PLLC (57) ABSTRACT

A seat recliner for a vehicle is provided and includes: a first plate; a second plate coupled with the first plate to define an inner space; a locking gear provided in the inner space, and provided with external teeth engaged with the first plate or the second plate; a locking cam configured to move the locking gear; an input member configured such that a first end thereof passes through the first plate and is coupled with a center of a locking cam to transmit torque thereto, and a second end thereof is exposed outside the first plate; and an elastic member wound around an outer circumferential surface of the second end of the input member, and configured such that a first end thereof is stopped by the input member, and a second end is stopped by an outer side of the first plate, thereby providing a restoring force.

13 Claims, 5 Drawing Sheets

(58) Field of Classification Search
USPC .......................................................... 297/373
See application file for complete search history.

(56) References Cited

U.S. PATENT DOCUMENTS

| | | | | |
|---|---|---|---|---|
| 7,703,852 B2* | 4/2010 | Wahls | ..................... | B60N 2/236 |
| | | | | 297/367 R |
| 8,251,451 B2* | 8/2012 | Dziedzic | ................ | B60N 2/236 |
| | | | | 297/366 |
| 8,708,412 B2* | 4/2014 | Berndtson | .............. | B60N 2/236 |
| | | | | 297/367 L |
| 9,296,315 B2* | 3/2016 | Hellrung | .............. | B60N 2/2356 |
| 9,902,297 B2* | 2/2018 | Robinson | ................ | B60N 2/236 |
| 2005/0168034 A1* | 8/2005 | Fast | ........................ | B60N 2/236 |
| | | | | 297/367 R |
| 2006/0055222 A1* | 3/2006 | Bonk | ..................... | B60N 2/236 |
| | | | | 297/367 R |
| 2007/0040436 A1* | 2/2007 | Oki | ........................ | B60N 2/236 |
| | | | | 297/367 R |
| 2008/0197687 A1 | 8/2008 | Luo et al. | | |

FOREIGN PATENT DOCUMENTS

| | | |
|---|---|---|
| KR | 20060132687 | 12/2006 |
| KR | 20120049334 | 5/2012 |
| KR | 20140001651 | 1/2014 |
| KR | 101393603 | 5/2014 |

* cited by examiner

SEAT RECLINER FOR VEHICLE

CROSS-REFERENCE TO RELATED APPLICATIONS

This application is a continuation of International Application No. PCT/KR2016/005724 filed on May 30, 2016, which claims the benefit of KR 10-2015-0136191, filed on Sep. 25, 2015. The disclosures of the above applications are incorporated herein by reference.

FIELD

The present disclosure relates to a seat recliner for a vehicle.

BACKGROUND

The statements in this section merely provide background information related to the present disclosure and may not constitute prior art.

The seat provided in transportation devices such as a vehicle includes a seat back for supporting the upper body of the passenger, a seat cushion for supporting the lower body such as the buttocks and thighs, and a headrest for supporting the back of the head, wherein at a junction of the seat back and the seat cushion, a reclining device is mounted, which allows the angle of the seat back to be adjusted relative to the seat cushion.

The reclining device is divided into a manual-type reclining device, in which the angle of the seat back is adjusted by the passenger manipulating a lever, and a power-type reclining device, which is automatically operated by the power of a motor through manipulating a switch, and all reclining devices, regardless of how they work, have strong coupling between components during the reclining operation to maintain passenger comfort and provide passenger safety.

In other words, the reclining device includes a component coupled with the seat back and a component coupled with the seat cushion and the two components exert a strong engagement force during the reclining operation. If the seat back has a weak engagement force, the angle of the seat back may be easily changed even with minor impact. In this case, the angle of the seat back is changed when an impact occurs, so that the passenger is injured.

As described above, in order for the reclining device to have a strong engagement force, it is necessary to maintain the locked state based on a strong elastic force so that the internal engagement is maintained well. To achieve this, the stronger elasticity a spring in the recliner has, the more stability the reclining device has.

However, conventionally, the spring of the recliner is placed inside and an elastic force for locking is applied to an input member, but the type and size of the spring is very limited since an inner space of the recliner is confined.

SUMMARY

The present disclosure provides a seat recliner for a vehicle, in which a sufficient elastic force of a spring is secured while an entire diameter of recliner is reduced.

According to one form of the present disclosure, there is provided a seat recliner for a vehicle, the seat recliner including: a first plate; a second plate coupled with the first plate to define an inner space, and configured to be rotated relative to the first plate; a locking gear provided in the inner space, and provided with external teeth engaged with internal teeth of the first plate or the second plate; a locking cam configured to move the locking gear forward or backward through a rotational motion; an input member configured such that a first end thereof passes through the first plate and is coupled with a center of a locking cam in the inner space to transmit torque to the locking cam, and a second end thereof is exposed outside the first plate; and an elastic member formed in a shape that is wound around an outer circumferential surface of the second end of the input member, and configured such that a first end thereof is stopped by the input member, and a second end is stopped by an outer side of the first plate, thereby providing a restoring force after the input member is rotated.

The first plate may be locked to a seat frame of a vehicle, and the second plate may be rotated relative to the first plate while being in contact with the first plate.

The second plate may be provided with the internal teeth along an inner circumference thereof, and the external teeth of the locking gear may be engaged with the internal teeth of the second plate.

Centers of the first plate and the locking cam may be provided with a first hole and a cam hole, respectively, and the input member may be coupled with the locking cam after the first end thereof passes through the first hole of the first plate and is inserted in the cam hole of the locking cam in the inner space.

The input member may be rotated relative to the first plate, and may be rotated along with the locking cam by being coupled thereto.

The input member may have a cross section in a quadrangular shape configured such that each corner has a curvature, the first hole may be a ring-shaped hole that comes into contact with the each corner of the input member, and the cam hole may be in the same shape as the cross section of the input member.

The seat recliner may further include a cap coupled to the first end of the input member passing through the second plate, outside the second plate.

The second plate may be provided with a second hole at a center thereof, with the first end of the input member being inserted thereinto, the second hole may be configured to be larger than an outer diameter of the first end of the input member, and the cap may include: a flange-shaped head; an inner leg extending from the head to protrude downward and coming into contact with an outer circumference of the input member; and an outer leg extending from the head to protrude downward and coming into contact with the second hole.

The head may be in a planar shape that comes into contact with an outer side of the second plate.

The inner leg and the outer leg of the cap may extend while being spaced apart from each other and are inserted in a space defined between the first end of the input member and second hole, and the inner leg may be formed in an interlocking structure with the first end of the input member and may be coupled thereto.

The elastic member may be in a form of a spiral spring configured such that after the spring is wound a plurality of times in a state where an inner end thereof is stopped by the exposed second end of the input member, and an outer end thereof may be stopped by the outer side of the first plate.

The elastic member may be wound a plurality of times on a virtual co-planar surface in a state of being in contact with the outer side of the first plate.

The second end of the input member may have a cross section in a quadrangular shape configured such that each corner has a curvature, and the inner end of the elastic member may be in a quadrangular shape configured to be bent along the outer circumferential surface of the second end of the input member.

The outer side of the first plate may be provided with a stop protrusion at a location spaced apart from the second end of the input member, and the outer end of the elastic member may be in a hook shape to be coupled with the first plate by being hooked to the stop protrusion.

The second end of the input member may be provided with a finishing flange that is vertically bent, and the elastic member may be disposed between the outer side of the first plate and the finishing flange.

According to the seat recliner of the present disclosure for a vehicle, it is possible to reduce the entire diameter of the recliner while securing a sufficient elastic force of the spring.

Further, when assembling the recliner, it is possible to couple the spring and stably fix the position of the spring.

Further, since the input member is used by modifying the structure of the conventional input member, no other mechanical design changes are desired, and since the spring is wound around the input member and stably locked thereto, durability is improved.

By increasing the elasticity of the spring, it is possible to provide stability against impacts, and at the same time, it is possible to make the entire diameter of the recliner smaller than the conventional one, thereby reducing the weight of moving parts and facilitating design of other parts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
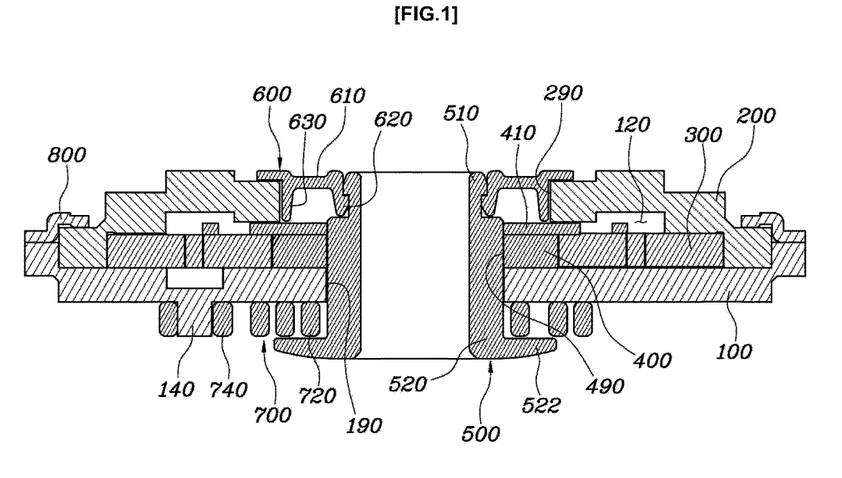
FIG. 1 is a sectional view showing a seat recliner for a vehicle according to one form of the present disclosure.
Figure 2:
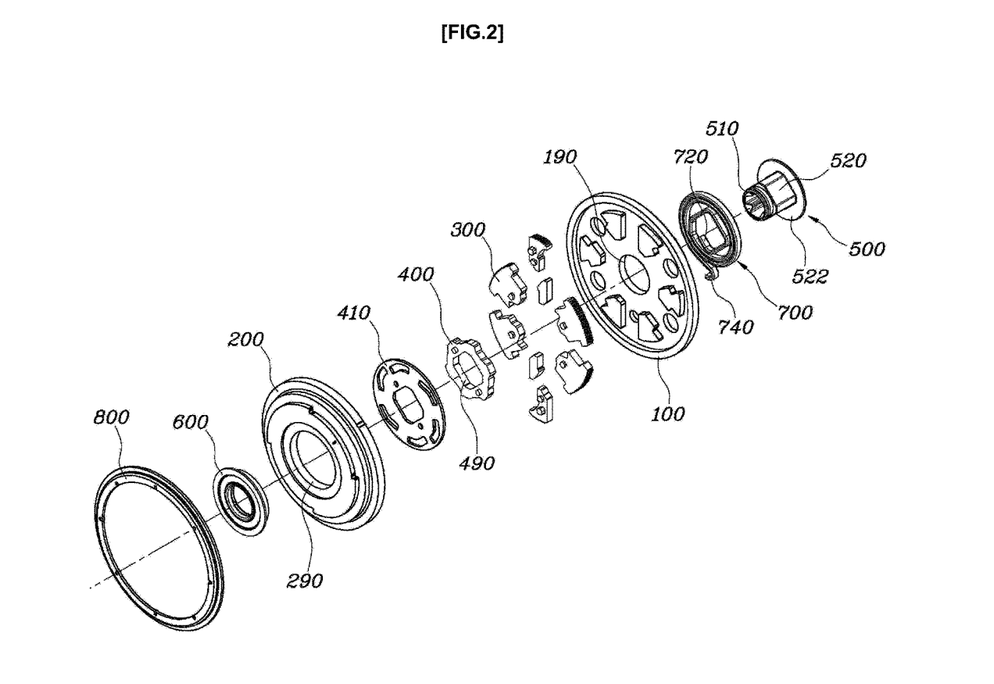
FIG. 2 is an exploded perspective view showing the seat recliner for a vehicle of FIG. 1.

FIG. 1 is a sectional view showing a seat recliner for a vehicle according to the present disclosure. FIG. 2 is an exploded perspective view showing the seat recliner for a vehicle of FIG. 1, wherein the seat recliner for a vehicle according to the present disclosure includes: a first plate 100; a second plate 200 coupled with the first plate 100 to define an inner space 120, and configured to be rotated relative to the first plate 100; a locking gear 300 provided in the inner space 120, and provided with external teeth 320 engaged with internal teeth of the first plate 100 or the second plate 200; a locking cam 400 configured to move the locking gear 300 forward or backward through a rotational motion; an input member 500 configured such that a first end 510 thereof passes through the first plate 100 and is coupled with a center of a locking cam 400 in the inner space 120 to transmit torque to the locking cam 400, and a second end 520 thereof is exposed outside the first plate 100; and an elastic member 700 formed in a shape that is wound around an outer circumferential surface of the second end 520 of the input member 500, and configured such that a first end 720 thereof is stopped by the input member 500, and a second end 740 is stopped by an outer side of the first plate 100, thereby providing a restoring force after the input member 500 is rotated.

The seat recliner for a vehicle is provided with the first plate 100 and the second plate 200 that is coupled with the first plate 100 to define the inner space and is configured to be rotated relative to the first plate 100. In this form, the first plate 100 is fixed to a seat frame of a vehicle, the second plate 200 is capable of relative rotation while being in contact with the first plate 100. Accordingly, the rotation of the second plate 200 is locked based on the first plate 100, whereby an angle between the seat back and a seat cushion is locked, and the angle of the seat back is adjusted when the second plate 200 is rotated.

Figure 5:
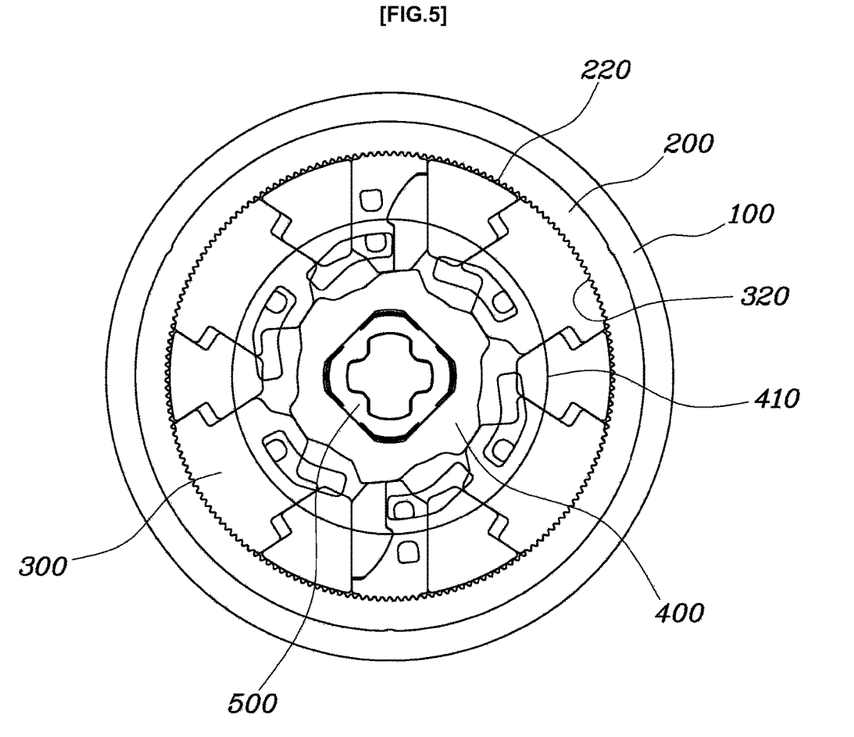
FIG. 5 is an assembled sectional view showing the seat recliner for a vehicle of FIG. 1.

Meanwhile, the inner space 120 is defined between the first plate 100 and the second plate 200, wherein the inner space 120 is provided with a reclining device. The reclining device is configured such that the second plate 200 is provided with the internal teeth 220 along an inner circumference thereof, and the locking gear 300 is provided with the external teeth 320. The locking gear 300 only performs a linear motion of forward or backward motion on the first plate 100, whereby when the locking gear 300 moves forward such that the internal teeth 220 of the second plate 200 and the external teeth 320 of the locking gear 300 are engaged with each other, the recliner is locked, and the angle of the seat back is locked, which is shown in FIG. 5.

Further, when the locking gear 300 moves backward to release the engagement, the second plate 200 is rotated relative to the first plate 100, whereby the angle of the seat back can be adjusted.

To be more specific, the locking gear 300 is provided in plural, and the center thereof is provided with the locking cam 400. The locking cam 400 is connected with the locking gear 300 via a control plate 410, whereby the control plate 410 is rotated according to the rotation of the locking cam 400, and the locking gear 300 moves forward or backward.

In the normal situation, the seat back needs to maintain its locked angle. In other words, the engagement between the locking gear 300 and the second plate 200 should be stably maintained. Accordingly, the reduced number of teeth of the second plate 200 and the reduced number of teeth of the locking gear 300 engaged with the second plate are set in design. For engagement between them, the locking gear 300 should be normally pressed against the internal teeth 220 of the second plate 200 so that the angle of the seat back is normally locked, which is closely related to the stability of a vehicle against crash.

In order for the locking gear 300 to be constantly pressed against the internal teeth 220 of the second plate 200, the locking cam 400 should constantly press the locking gear 300 in a forward direction. To achieve this, the locking cam 400 is generally designed to be applied with an elastic force in the pressure direction by a spring.

Further, the spring providing the elastic force for locking is generally configured to directly press the locking cam 400 or the locking gear 300 in the inner space 120 defined by the first plate 100 and the second plate 200. This is because durability of the spring is closely related to the stability of a vehicle against crash, and accordingly, manufacturers are reluctant to expose the spring to the outside to provide durability of the spring, and believe that the spring should directly press the locking gear 300 or the locking cam 400, which is related to the rotation.

However, when the spring is provided inside, it is very difficult to select the type and size of the required spring due to the limit of the inner space 120. If it is intended that the spring be made small to make it better for design, it is difficult to obtain the required elasticity of the spring. On the contrary, if it is intended to sufficiently secure the elasticity of the spring, it is difficult for the spring to be mounted in the inner space 120 due to its type or size.

The present disclosure is configured such that sufficient strength is obtained by making the spring a spiral spring, and it is advantageous in terms of inertia and weight by reducing the size of the reclining device more than the conventional reclining device by providing the spring to the outside, and further, external exposure of the spring is reduced by modifying the conventional structure, thereby stably providing durability.

To be more specific, the locking gear 300 of the present disclosure is provided in the inner space 120, and is provided with the external teeth 320 engaged with the internal teeth of the first plate 100 or the second plate 200. Further, the locking cam 400 is configured to move the locking gear 300 forward or backward through a rotational motion.

Torque of the locking cam 400 is transmitted through the input member 500, and the input member 500 is configured such that the first end thereof passes through the first plate 100 to be inserted in the inner space 120, and then is coupled with the center of the locking cam 400 in the inner space 120 to transmit the torque to the locking cam 400. Further, the second end 520 of the input member 500 maintains its state of being exposed outside the first plate 100, whereby it is possible to transmit the torque applied from the outside to the inside locking cam 400.

Further, the elastic member 700 as the spring of the present disclosure is formed in a shape that is wound around the outer circumferential surface of the second end 520 of the input member 500, and is configured such that the first end 720 is stopped by the input member 500, and the second end 740 is stopped by the outer side of the first plate 100, thereby providing a restoring force after the input member 500 is rotated, whereby the input member 500 provides the elastic force to the locking cam 400 all the time, and the locking cam 400 presses the locking gear 300 in the forward direction, thereby performing locking of the seat back at all times.

As described above, since the spring is provided to the outside and is configured to provide the elastic torque to the locking cam 400 through the input member 500, the stability of locking is greatly increased when compared with the conventional small spring which directly presses the locking cam 400 or the locking gear 300 in the inside.

Further, as shown in FIG. 1, the spring is eliminated from the inside, whereby the entire thickness of the recliner is reduced, the rigidity is improved due to the simple shapes of both the first plate 100 and the second plate 200, and since the weight of moving parts is reduced, they are freer in inertia.

Figure 3:
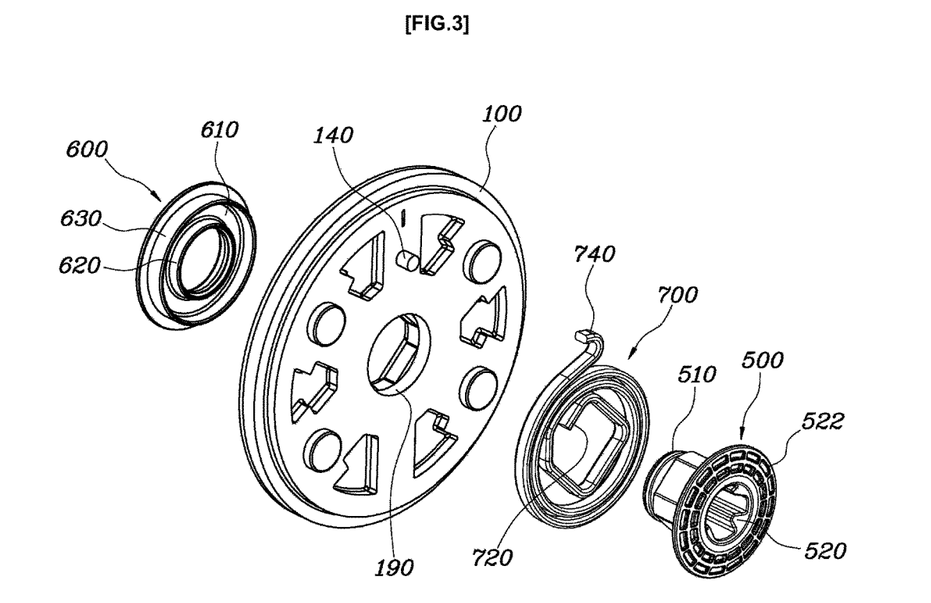
FIG. 3 is another exploded perspective view showing the seat recliner for a vehicle of FIG. 1.
Figure 4:
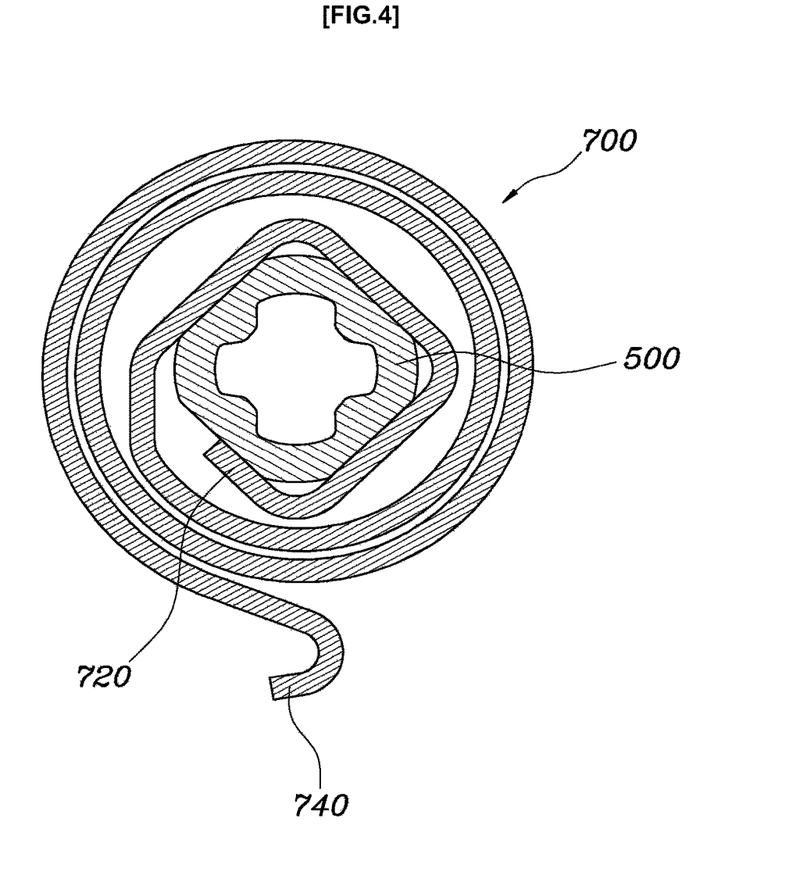
FIG. 4 is a view showing an elastic member of the seat recliner for a vehicle of FIG. 1.

Meanwhile, FIG. 3 is another exploded perspective view showing the seat recliner for a vehicle of FIG. 1; and FIG. 4 is a view showing an elastic member of the seat recliner for a vehicle of FIG. 1. To be more specific, centers of the first plate 100 and the locking cam 400 may be provided with a first hole 190 and a cam hole 490, respectively, and the input member 500 may be coupled with the locking cam 400 after the first end 510 thereof passes through the first hole 190 of the first plate 100 and is inserted in the cam hole 490 of the locking cam 400 in the inner space 120. In other words, after the assembly of the first plate 100, the second plate 200, and the inner parts is finished, the spring can be simply coupled from the outside.

Further, the input member 500 may be rotated relative to the first plate 100, and may be may be rotated along with the locking cam 400 by being coupled thereto. Thereby, it is possible to perform locking or unlocking, and it is appropriate that the spring is stopped by the input member 500 since the torque is transmitted from the outside.

In particular, as shown in the drawings, the input member 500 may have a cross section in a quadrangular shape configured such that each corner has a curvature, the first hole 190 may be a ring-shaped hole that comes into contact with each corner of the input member 500, and the cam hole 490 may be in the same shape as the cross section of the input member 500. Thereby, even though the input member 500 is in a quadrangular shape, it can be rotated by being supported by the first plate 100 through the first hole 190. Further, the input member is inserted into the cam hole 490 through its quadrangular cross section, to be stably locked to the locking cam 400, whereby it is possible to transmit torque without clearance.

Further, a cap 600 is coupled to the first end of the input member 500 having passed through the second plate 200, outside the second plate 200. Accordingly, the input member 500 is inserted while coupling the spring, and the cap 600 is coupled on the outer side of the second plate 200 side, whereby assembly can be performed easily.

Further, as shown in FIG. 1, the second plate 200 may be provided with a second hole 290 at a center thereof, with the first end of the input member 500 being inserted thereinto, the second hole 290 may be configured to be larger than an outer diameter of the first end 510 of the input member 500, and the cap 600 may include: a flange-shaped head 610; an inner leg 620 extending from the head 610 to protrude downward and coming into contact with an outer circumference of the input member 500; and an outer leg 630 extending from the head 610 to protrude downward and coming into contact with the second hole 290.

The input member 500 is coupled with the cap 600 through a locking structure, whereby it can be easily coupled therewith without separation. However, in the process, some deformation may occur, since the outer leg 630 supports the second hole 290 by being brought into contact therewith, it can be simply coupled while allowing some deformation, and the input member can transmit power while being rotated even after the assembly.

The head 610 of the cap 600 the may be in a planar shape that comes into contact with an outer side of the second plate 200, whereby it can be stably locked and its thickness can be reduced. Further, the inner leg 620 and the outer leg 630 of the cap 600 may extend while being spaced apart from each other and be inserted in a space defined between the first end 510 of the input member 500 and second hole 290, and the inner leg 620 may be formed in an interlocking structure with the first end 510 of the input member 500 and may be coupled thereto. Thereby, the coupling of the cap 600 and the input member 500 is simple and stable, and they are supported by the outer leg 630 during rotation of the input member 500 after assembly, so durability is provided.

Meanwhile, the elastic member 700 may be in a form of a spiral spring configured such that after the spring is wound a plurality of times in a state where an inner end 720 thereof is stopped by the exposed second end 520 of the input member 500, and an outer end 740 thereof is stopped by the outer side of the first plate 100. By applying the spiral spring, long-term performance can be maintained in terms of providing elasticity.

Further, the elastic member 700 may be wound a plurality of times on a virtual co-planar surface in a state of being in contact with the outer side of the first plate 100. Thereby, it is possible to reduce the thickness of the spring while obtaining its rigidity, and particularly, such a spiral spring is secured in its radial size, so it can be free from such restriction by being installed outside.

Further, the second end 520 of the input member 500 may have a cross section in a quadrangular shape configured such that each corner has a curvature, and the inner end 720 of the elastic member 700 may be in a quadrangular shape configured to be bent along the outer circumferential surface of the second end 520 of the input member 500. Accordingly, it is possible to maintain mutual interlocking with only a quadrangular shape without an additional coupling means or the like, thereby simplifying locking.

Further, the outer side of the first plate 100 may be provided with a stop protrusion 140 at a location spaced apart from the second end 520 of the input member 500, and the outer end 740 of the elastic member 700 may be in a hook shape to be coupled with the first plate by being hooked to the stop protrusion 140. Accordingly, the elastic member can store the elastic force by being deformed when the input member 500 is rotated.

Meanwhile, the second end 520 of the input member 500 may be provided with a finishing flange 522 that is vertically bent, and the elastic member 700 may be disposed between the outer side of the first plate 100 and the finishing flange 522. Through this structure, it is possible to inhibit the spring from being exposed outside as much as possible, whereby it is possible to inhibit contamination of the spring itself and to maintain its durability, in particular, to inhibit the spring from being twisted in an axial direction, thereby providing stability of operation.

According to the seat recliner for a vehicle of the present disclosure, it is possible to reduce the entire diameter of the recliner while providing the desired elasticity of the spring.

Further, when assembling the recliner, it is possible to couple the spring and stably fix the position of the spring.

Further, since the input member is used by modifying the structure of the conventional input member, no other mechanical design changes are desired, and since the spring is wound around the input member and stably locked thereto, durability is improved.

By increasing the elasticity of the spring, it is possible to provide stability against crash, and at the same time, it is possible to make the entire diameter of the recliner smaller than the conventional one, thereby reducing the weight of moving parts and facilitating design of other parts.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seat recliner for a vehicle, the seat recliner comprising:
    a first plate;
    a second plate coupled with the first plate to define an inner space, and configured to be rotated relative to the first plate;
    a locking gear disposed in the inner space, the locking gear having external teeth engaged with internal teeth of the first plate or the second plate;
    a locking cam configured to move the locking gear forward or backward through a rotational motion;
    an input member configured such that a first end passes through the first plate and coupled with a center of a locking cam in the inner space to transmit torque to the locking cam, and a second end is exposed outside the first plate; and
    an elastic member defining a shape that is wound around an outer circumferential surface of the second end of the input member, and configured such that a first end is stopped by the input member, and a second end is stopped by an outer side of the first plate, thereby providing a restoring force after the input member is rotated; and
    a cap coupled to the first end of the input member and passing through the second plate, the cap disposed outside the second plate, wherein the second plate includes a second hole at a center of the second plate, the first end of the input member disposed through the second hole, the second hole being larger than an outer diameter of the first end of the input member, the cap comprising:
    a flange-shaped head;
    an inner leg extending from the flange-shaped head and protruding downward to contact an outer circumference of the input member; and
    an outer leg extending from the flange-shaped head and protruding downward to contact with the second hole.

2. The seat recliner of claim 1, wherein the first plate is locked to a seat frame of a vehicle, and the second plate is rotated relative to the first plate while being in contact with the first plate.

3. The seat recliner of claim 1, wherein the second plate and the internal teeth are disposed along an inner circumference, and the external teeth of the locking gear are engaged with the internal teeth of the second plate.

4. The seat recliner of claim 1, wherein a center of the first plate includes a first hole and a center of the locking cam includes a cam hole, and the input member is coupled with the locking cam after the first end passes through the first hole of the first plate and is inserted in the cam hole of the locking cam in the inner space.

5. The seat recliner of claim 4, wherein when the input member is rotated relative to the first plate, the input member is rotated with the locking cam.

6. The seat recliner of claim 4, wherein the input member defines a quadrangular shape cross section configured such that each corner has a curvature, the first hole defines a ring-shaped hole that comes into contact with each corner of the input member, and the cam hole defines the same shape as the cross section of the input member.

7. The seat recliner of claim 1, wherein the head is in a planar shape that comes into contact with an outer side of the second plate.

8. The seat recliner of claim 1, wherein the inner leg and the outer leg of the cap extend while being spaced apart from each other and are inserted in a space defined between the first end of the input member and second hole, and the inner leg comprising an interlocking structure with the first end of the input member and is coupled thereto.

9. The seat recliner of claim 1, wherein the elastic member is a spiral spring configured such that after the spring is wound a plurality of times, an inner end is stopped by the exposed second end of the input member, and an outer end is stopped by the outer side of the first plate.

10. The seat recliner of claim 9, wherein the elastic member is wound a plurality of times on a virtual co-planar surface in a state of being in contact with the outer side of the first plate.

11. The seat recliner of claim 9, wherein the second end of the input member has a quadrangular shaped cross section configured such that each corner has a curvature, and the inner end of the elastic member defines a quadrangular shape configured to be bent along the outer circumferential surface of the second end of the input member.

12. The seat recliner of claim 9, wherein the outer side of the first plate is provided with a stop protrusion at a location spaced apart from the second end of the input member, and the outer end of the elastic member defines a hook shape to be coupled with the first plate by being hooked to the stop protrusion.

13. The seat recliner of claim 9, wherein the second end of the input member includes a finishing flange that is vertically bent, and the elastic member is disposed between the outer side of the first plate and the finishing flange.

* * * * *